US010143059B1

(12) United States Patent
Liang et al.

(10) Patent No.: US 10,143,059 B1
(45) Date of Patent: Nov. 27, 2018

(54) CIRCUIT OF DIMMING AND TONING BASED ON A DRIVER ON BOARD MODULE

(71) Applicant: SHENZHEN ANGELED CO., LTD, Shenzhen, Guangdong (CN)

(72) Inventors: Youqing Liang, Guangdong (CN); Donglei Tian, Guangdong (CN); Binhua Deng, Guangdong (CN)

(73) Assignee: SHENZHEN ANGELED CO., LTD, Shenzhen (CN)

( * ) Notice: Subject to any disclaimer, the term of this patent is extended or adjusted under 35 U.S.C. 154(b) by 0 days.

(21) Appl. No.: 15/687,436

(22) Filed: Aug. 25, 2017

(30) Foreign Application Priority Data

May 26, 2017 (CN) .......................... 2017 1 0382435

(51) Int. Cl.
*H05B 37/02* (2006.01)
*H05B 33/08* (2006.01)

(52) U.S. Cl.
CPC ..... *H05B 33/0866* (2013.01); *H05B 33/0815* (2013.01); *H05B 33/0845* (2013.01); *H05B 33/0851* (2013.01)

(58) Field of Classification Search
CPC .................................................. H05B 33/0851
USPC ...................................... 315/185 R, 291, 307
See application file for complete search history.

(56) References Cited

U.S. PATENT DOCUMENTS

| | | | | |
|---|---|---|---|---|
| 9,125,259 B1* | 9/2015 | Xiong | ................ | H05B 33/0815 |
| 2011/0128303 A1* | 6/2011 | Yonemaru | .......... | H05B 33/0827 |
| | | | | 345/690 |
| 2014/0139134 A1* | 5/2014 | Cheng | ................ | H05B 33/0827 |
| | | | | 315/291 |
| 2015/0289339 A1* | 10/2015 | Wu | ..................... | H05B 33/0869 |
| | | | | 315/152 |

* cited by examiner

*Primary Examiner* — Thuy Vinh Tran

(57) ABSTRACT

The invention discloses a circuit of dimming and toning based on a driver on board module, relates to LED driving circuit technology field, which includes a silicon controlled dimming circuit module, a rectifier module, an AC constant current power supply module, a plurality of balanced architecture LED modules, and a color feedback comparison module. The AC constant current power supply module includes a plurality of AC constant current power supply sub units supplying power for the balanced architecture LED modules correspondingly. The color feedback comparison module is located between two balanced architecture LED modules to compare voltages generated thereby and no power contrast feedback between two balanced architecture LED modules is generated when the silicon controlled dimming circuit module adjusts current, so that the color feedback comparison module makes an LED bead thereof to choose road between the balanced architecture LED modules to realize color temperature adjusting.

6 Claims, 3 Drawing Sheets

US 10,143,059 B1

CIRCUIT OF DIMMING AND TONING BASED ON A DRIVER ON BOARD MODULE

CROSS REFERENCE TO RELATED APPLICATIONS

The present application claims the benefit of Chinese Patent Application No. 201710382435.0 filed on May 26, 2017. All the above are hereby incorporated by reference.

FIELD

The present disclosure generally relates to LED driving circuit technology field, and more particularly to a circuit of dimming and toning based on a driver on board module.

BACKGROUND

In recent years, the LED lamp instead of the traditional incandescent lamp has been widely used as lighting source. With the increasing requirement of LED lighting source and the development of LED technology, the dimming LED lighting source is came into being. However, linear constant current drive silicon controlled dimming circuit of existing LED lighting source can achieve monochrome brightness adjustment only, but cannot adjust color application, namely the LED lamp cannot provide the effect of linear color temperature adjustment. Although some LED lamps can adjust color temperature, the effect of color temperature is achieved by using expensive microcontroller technology.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the circuits of the present embodiments. Moreover, in the drawings, all the views are schematic, and like reference numerals designate corresponding parts throughout the several views.

DETAILED DESCRIPTION

Figure 1:
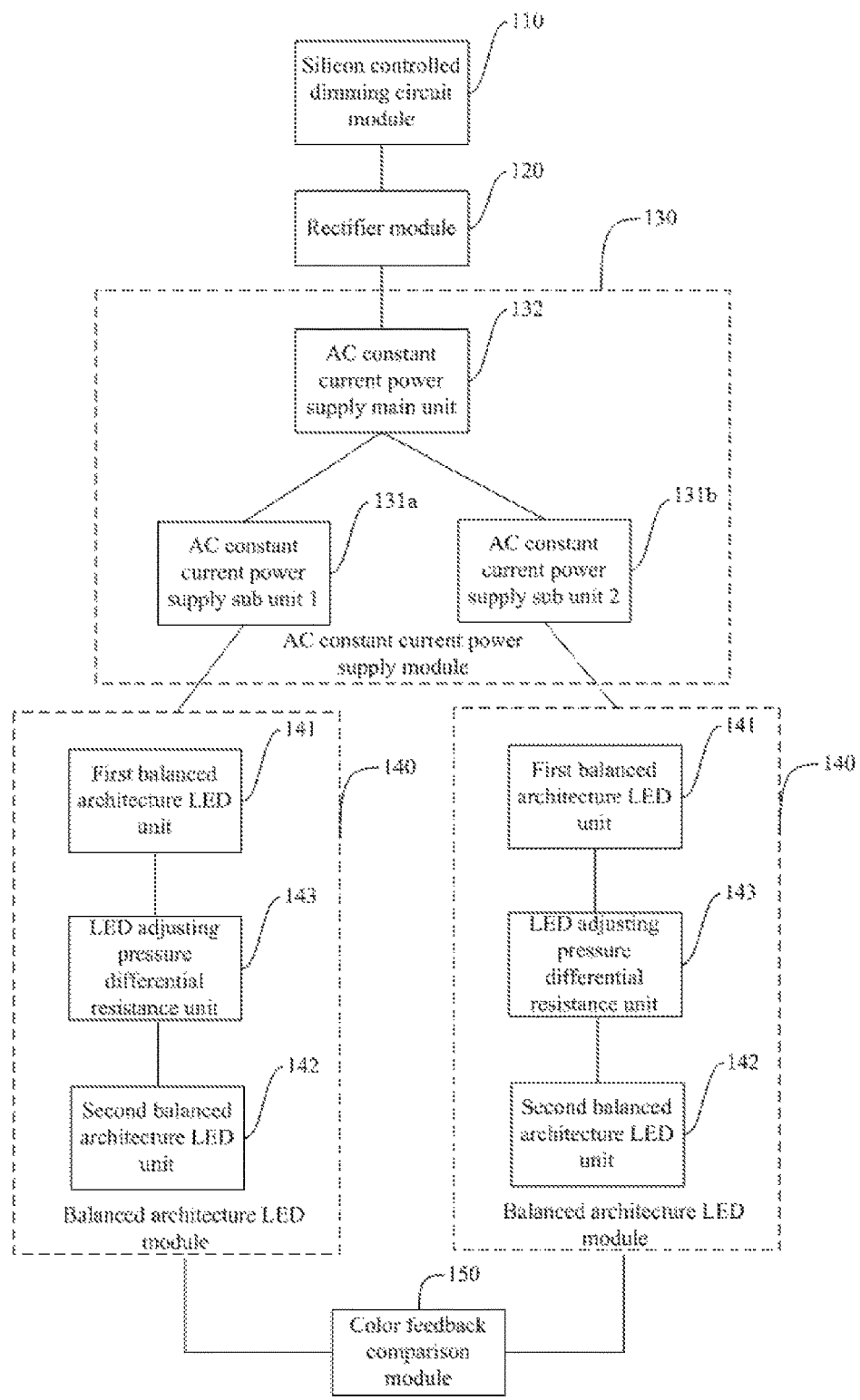
FIG. 1 is a functional block diagram of a circuit of dimming and toning based on a driver on board module.

The disclosure is illustrated by way of example and not by way of limitation in the figures of the accompanying drawings in that like reference numerals indicate similar elements. It should be noted that references to "an" or "one" embodiment in this disclosure are not necessarily to the same embodiment, and such references can mean "at least one."

Figure 2:
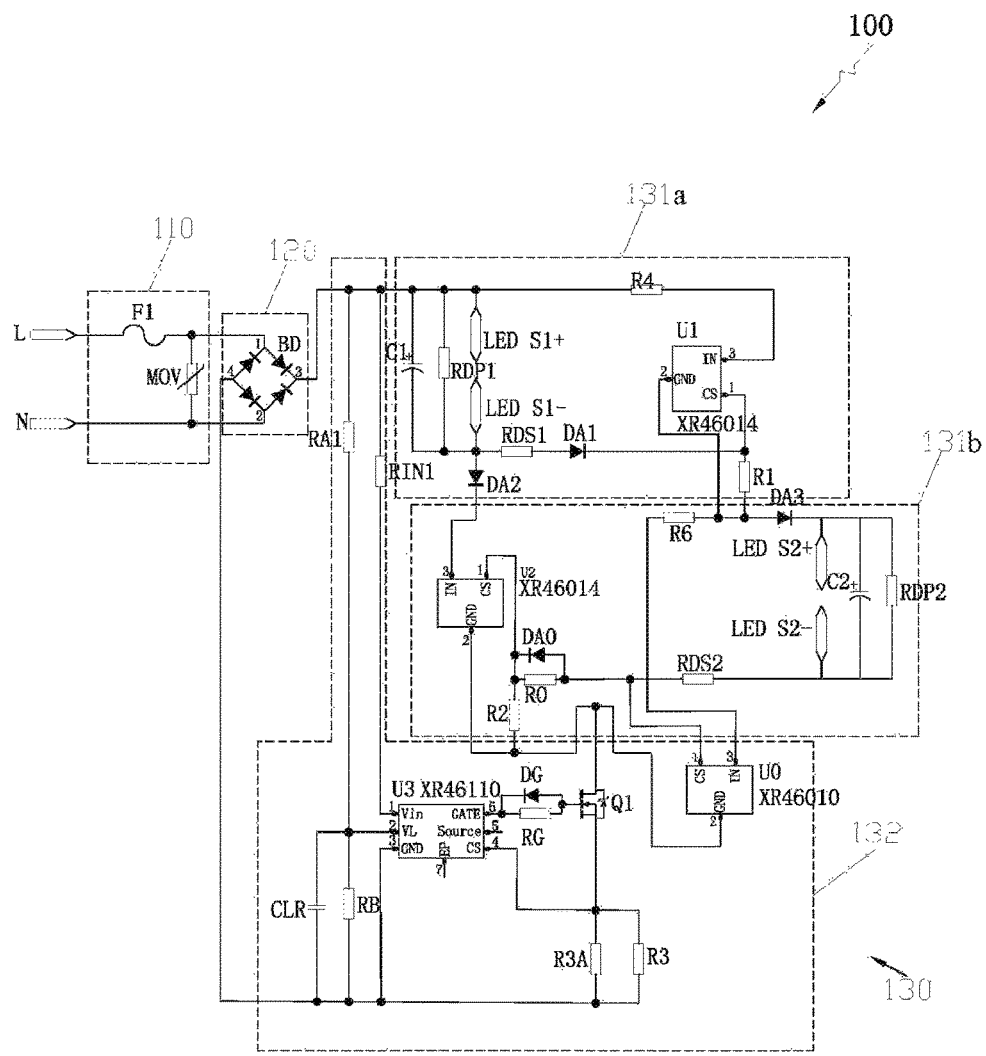
FIG. 2 is a first part of the functional block diagram of FIG. 1.
Figure 3:
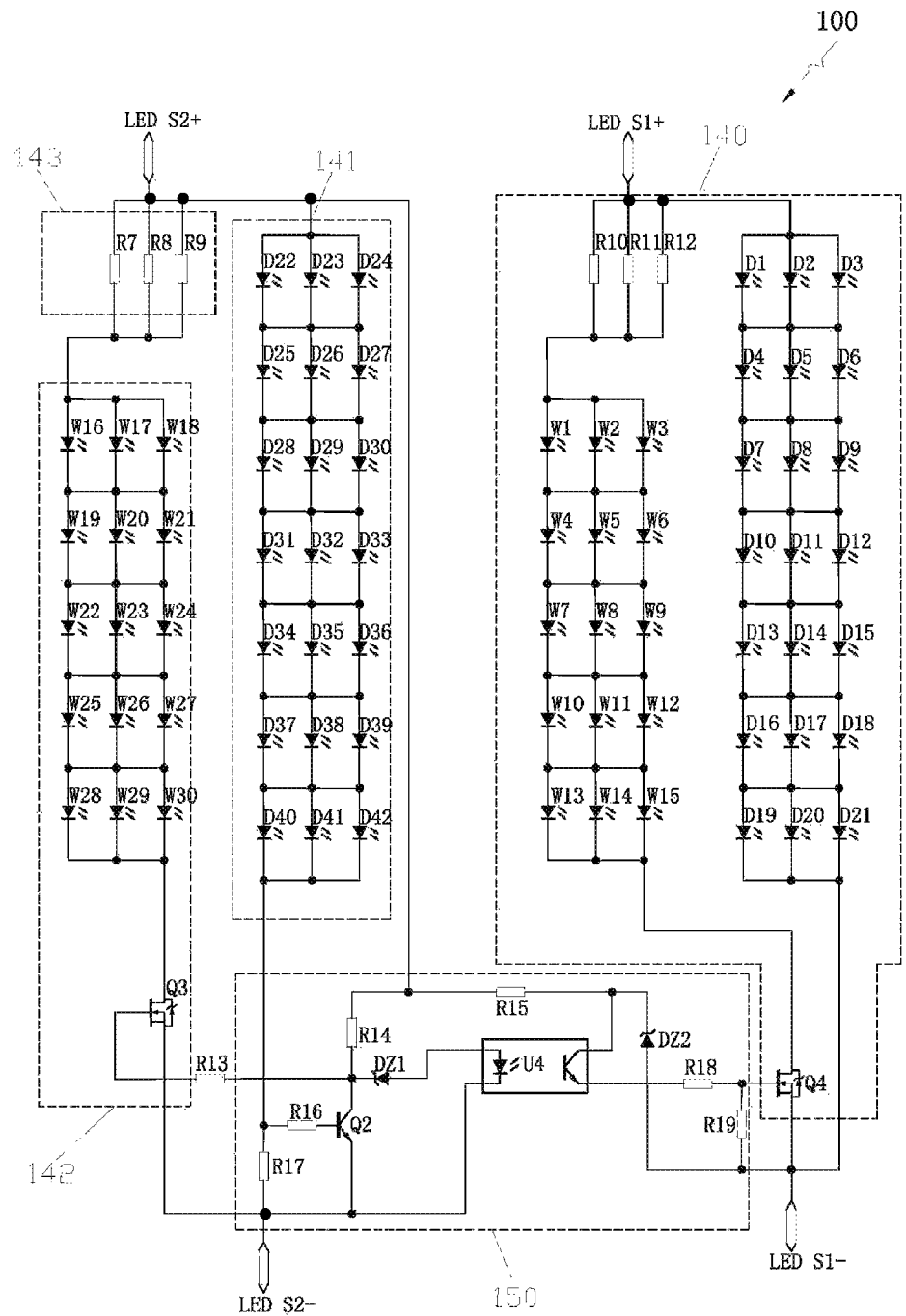
FIG. 3 is a second part of the functional block diagram of FIG. 1.

FIGS. 1-3 illustrate a first embodiment of a circuit of dimming and toning based on a driver on board module 100. The circuit of dimming and toning based on the driver on board module 100 includes a silicon controlled dimming circuit module 110, a rectifier module 120, an AC constant current power supply module 130, a plurality of balanced architecture LED modules 140, and a color feedback comparison module 150. The silicon controlled dimming circuit module 110, the rectifier module 120, and the AC constant current power supply module 130 are electronically connected respectively. The AC constant current power supply module 130 includes a plurality of AC constant current power supply sub units 131a, 131b supplying power for the balanced architecture LED modules 140 correspondingly. The color feedback comparison module 150 is located between two balanced architecture LED modules 140 to compare voltages generated thereby and no power contrast feedback between two balanced architecture LED modules 140 when the silicon controlled dimming circuit module 110 adjusts current, which makes an LED bead U4 included in the color feedback comparison module 150 to choose road between the balanced architecture LED modules 140 to realize colour temperature adjusting.

In one embodiment, FIGS. 1-2 illustrate that the AC constant current power supply module 130 further includes an AC constant current power supply main unit 132. The AC constant current power supply main unit 132 is electrically connected between the rectifier module 120 and the AC constant current power supply sub units 131a, 131b, which can appropriately assign the current outputted by the rectifier module 120 to the AC constant current power supply sub units 131a, 131b. In detail, the AC constant current power supply main unit 132 is a linear constant current switching circuit composed by a chip typed of XR 46110, a chip typed of XR46010, and a first switch MOS tube. The AC constant current power supply sub units 131a, 131b is a linear constant current power supply circuit based on a chip typed of XR46014. The electronic structures of XR46110, XR46010 and XR46014 are described in more detail in their datasheets respectively, published by Exar Corporation of California in 2016. The above datasheets are readily available, for example, at "https://www.alldatasheet.com/" and incorporated herein by reference.

FIG. 1 and FIG. 3 illustrate that the balanced architecture LED module 140 includes a first balanced architecture LED unit 141, a second balanced architecture LED unit 142 with a second switch MOS tube, and a LED adjusting pressure differential resistance unit 143. The LED adjusting pressure differential resistance unit 143 is electrically connected between the first balanced architecture LED unit 141 and the second balanced architecture LED unit 142. The first balanced architecture LED unit 141 and the second balanced architecture LED unit 142 include a plurality of matrix LED beads respectively. The LED adjusting pressure differential resistance unit 143 make the first balanced architecture LED unit 141 and the second balanced architecture LED unit 142 of the balanced architecture LED module 140 change differential pressure.

FIG. 3 illustrates that the color feedback comparison module 150 is a passive contrast feedback circuit composed by a triode and a photoelectric coupler. When the silicon controlled dimming circuit module 110 is adjusted the current, the color feedback comparison module 150 compares voltages between two balanced architecture LED modules 140, so that a switchable pressure differential is generated between an emitting electrode and a base electrode of the triode. The switchable pressure differential is fed back to each second switch MOS tube by the photoelectric coupler, which makes each second switch MOS tube form a conducting or semi conducting or closed state respectively. The passive contrast feedback circuit makes the LED bead included in the photoelectric coupler to choose road to realize colour temperature adjusting between the plurality of balanced architecture LED modules 140.

In detail, FIGS. 1-3 illustrate that the LED dimming and coloring circuit 100 includes two balanced architecture LED modules 140, and a color feedback comparison module 150 according to actual need, in the illustrated embodiment, the color feedback comparison module 150 is located between two balanced architecture LED modules 140. In this way, as illustrated in FIG. 1, the AC constant current power supply module 130 includes two AC constant current power supply sub units 131a, 131b supplying power for the balanced architecture LED modules 140 correspondingly. When the silicon controlled dimming circuit module 110 adjusts current, the first balanced architecture LED unit 141 and the second balanced architecture LED unit 142 of a first balanced architecture LED module 140 change differential pressure with the first balanced architecture LED unit 141 and the second balanced architecture LED unit 142 of a second balanced architecture LED module 140. The triode compares with the current flowed through R14 and R15 to make sample comparison, so that a switchable pressure differential is generated between an emitting electrode and a base electrode of the triode. The switchable pressure differential is fed back to the second switch MOS tube Q3 of the second balanced architecture LED unit 142 of the second balanced architecture LED module 140, and the second switch MOS tube Q4 of the second balanced architecture LED unit 142 of the second balanced architecture LED module 140 by the photoelectric coupler U4, which makes the second switch MOS tube Q3 and Q4 form a conducting or semi conducting or closed state respectively. The passive contrast feedback makes the LED bead to choose road to realize colour temperature adjusting between the plurality of balanced architecture LED modules 140.

The circuit of dimming and toning based on the driver on board module provided in the present invention configures the plurality of balanced architecture LED modules 140 and the color feedback comparison module 150. The color feedback comparison module 150 is located between two balanced architecture LED modules to compare voltages generated thereby and no power contrast feedback between two balanced architecture LED modules is generated when the silicon controlled dimming circuit adjusts current, so that the color feedback comparison module makes an LED bead U4 included in the color feedback comparison module 150 to choose road to realize colour temperature adjusting. The circuit of dimming and toning of this invention uses simple balanced architecture LED modules and the color feedback comparison module 150 to make the LED beads adjust color temperature, rather than using expensive microcontroller technology.

Although various features and elements are described as embodiments in particular combinations, each feature or element can be used alone or in other various combinations within the circuit of the present disclosure to the full extent indicated by the broad general meaning of the terms in which the appended claims are expressed.

What is claimed is:

1. A circuit of dimming and toning based on a driver on board module, comprising:
    a silicon controlled dimming circuit module;
    a rectifier module;
    a plurality of balanced architecture LED modules;
    an AC constant current power supply module comprising a plurality of AC constant current power supply sub units supplying power for the plurality of balanced architecture LED modules respectively; and
    a color feedback comparison module;
    wherein the silicon controlled dimming circuit module, the rectifier module, and the AC constant current power supply module are electrically connected to each other;
    wherein the color feedback comparison module is located between every two balanced architecture LED modules to compare voltages generated thereby and no power contrast feedback between two balanced architecture LED modules is generated when the silicon controlled dimming circuit module adjusts current, so that the color feedback comparison module makes an LED bead thereof to choose road between the balanced architecture LED modules to realize colour temperature adjusting.

2. The circuit of claim 1, wherein the AC constant current power supply module further comprises an AC constant current power supply main unit electrically connected between the rectifier module and the AC constant current power supply sub units to assign a current outputted by the rectifier module to the AC constant current power supply sub units.

3. The circuit of claim 2, wherein each of the balanced architecture LED modules comprises a first balanced architecture LED unit, a second balanced architecture LED unit including a second switch MOS tube, and an LED adjusting pressure differential resistance unit electrically connected to the first balanced architecture LED unit and the second balanced architecture LED unit, and the first balanced architecture LED unit and the second balanced architecture LED unit respectively comprises a plurality of matrix LED beads.

4. The circuit of claim 3, wherein the color feedback comparison module is a passive contrast feedback circuit composed by a triode and a photoelectric coupler, when the silicon controlled dimming circuit module is adjusted, the color feedback comparison module compares voltages between two balanced architecture LED modules so that a switchable pressure differential is generated between an emitting electrode and a base electrode of the triode, the switchable pressure differential is fed back to each second switch MOS tube by the photoelectric coupler, which makes each second switch MOS tube form a conducting or semi conducting or closed state respectively, and the passive contrast feedback circuit makes the plurality of matrix LED beads to choose road to realize colour temperature adjusting between the plurality of balanced architecture LED modules.

5. The circuit of claim 1, wherein each of the balanced architecture LED modules comprises a first balanced architecture LED unit, a second balanced architecture LED unit including a second switch MOS tube, and an LED adjusting pressure differential resistance unit electrically connected to the first balanced architecture LED unit and the second balanced architecture LED unit, and the first balanced architecture LED unit and the second balanced architecture LED unit respectively comprises a plurality of matrix LED beads.

6. The circuit of claim 5, wherein the color feedback comparison module is a passive contrast feedback circuit composed by a triode and a photoelectric coupler, when the silicon controlled dimming circuit module is adjusted, the color feedback comparison module compares voltages between two balanced architecture LED modules so that a switchable pressure differential is generated between an emitting electrode and a base electrode of the triode, the switchable pressure differential is fed back to each second switch MOS tube by the photoelectric coupler, which makes each second switch MOS tube form a conducting or semi conducting or closed state respectively, and the passive contrast feedback circuit makes the plurality of matrix LED beads to choose road to realize colour temperature adjusting between the plurality of balanced architecture LED modules.

\* \* \* \* \*